May 2, 1961 W. THOMPSON, JR 2,982,066
PACKAGING APPARATUS
Filed June 25, 1956 6 Sheets-Sheet 2

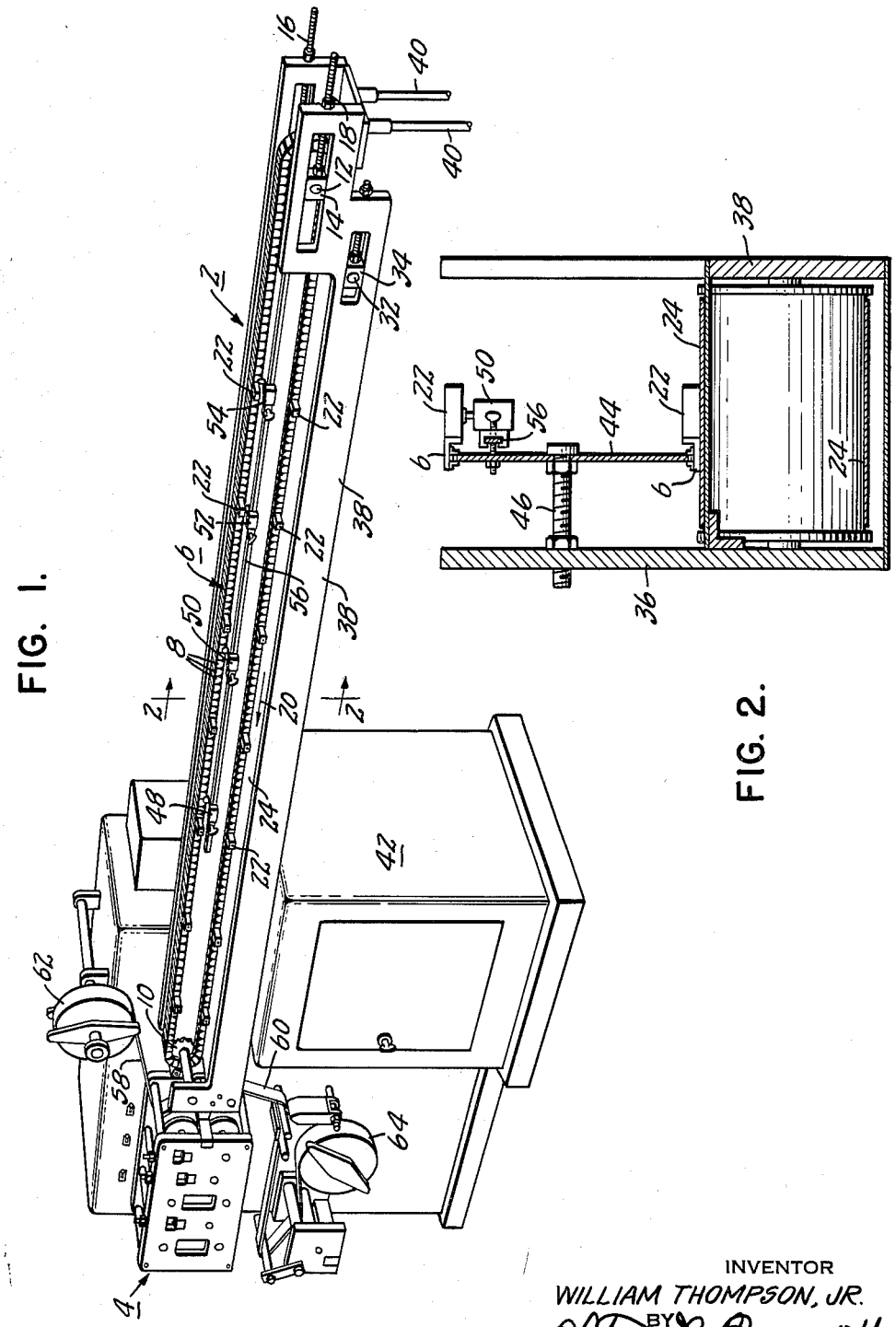

INVENTOR
WILLIAM THOMPSON, JR.
BY
ATTORNEY

May 2, 1961

W. THOMPSON, JR 2,982,066

PACKAGING APPARATUS

Filed June 25, 1956

INVENTOR
WILLIAM THOMPSON, JR.
BY
ATTORNEY

May 2, 1961 W. THOMPSON, JR 2,982,066
PACKAGING APPARATUS

Filed June 25, 1956 6 Sheets-Sheet 4

INVENTOR
WILLIAM THOMPSON, JR.
BY
ATTORNEY

May 2, 1961

W. THOMPSON, JR 2,982,066

PACKAGING APPARATUS

Filed June 25, 1956

INVENTOR
WILLIAM THOMPSON, JR.

ATTORNEY

May 2, 1961   W. THOMPSON, JR   2,982,066
PACKAGING APPARATUS

Filed June 25, 1956   6 Sheets-Sheet 6

INVENTOR
WILLIAM THOMPSON, JR.
BY
ATTORNEY

United States Patent Office 2,982,066
Patented May 2, 1961

2,982,066

PACKAGING APPARATUS

William Thompson, Jr., Bergenfield, N.J., assignor to Roto Wrap Machine Company, Englewood, N.J., a corporation of New Jersey Filed June 25, 1956, Ser. No. 593,505

18 Claims. (Cl. 53—180)

This invention relates to a continuous packaging machine and is described as embodied in a strip packaging machine for the purpose of packaging articles between two continuous webs of plastic material and sealing the webs together along the outer edges and cross wise at spaced intervals to form a series of sealed separate compartments. This strip is divided into separate packages by cutting the strips cross wise through some or all of the lateral seals.

The various aspects, objects and advantages of this invention will be in part pointed out, in part apparent from the following detailed description of a strip packaging machine embodying the invention considered in conjunction with the accompanying drawings in which:

Figure 1 is a perspective view of a strip packaging machine embodying the present invention;

Figure 2 is a cross-sectional view taken along line 2—2 of Figure 1 showing the construction of the conveyor mechanism;

Figure 19:
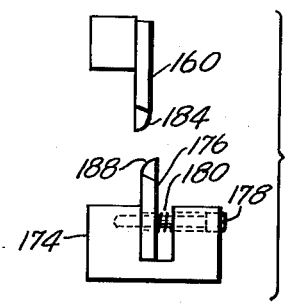
Figure 20:
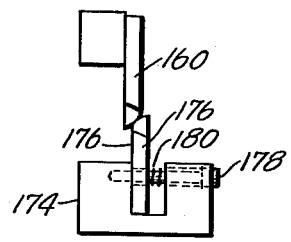
Figure 21:
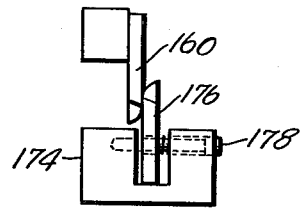
Figure 18:
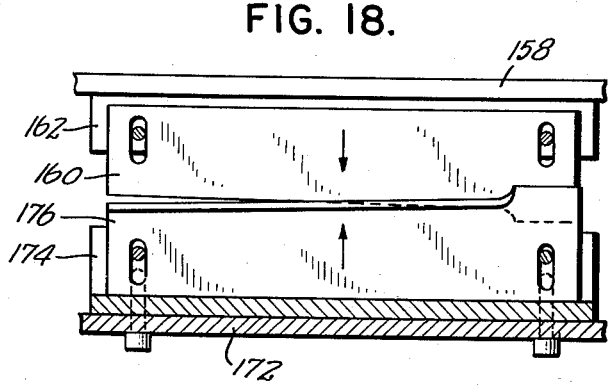
Figure 18 is a partial elevational view of the cutting mechanism shown in Figure 17.
Figure 22:
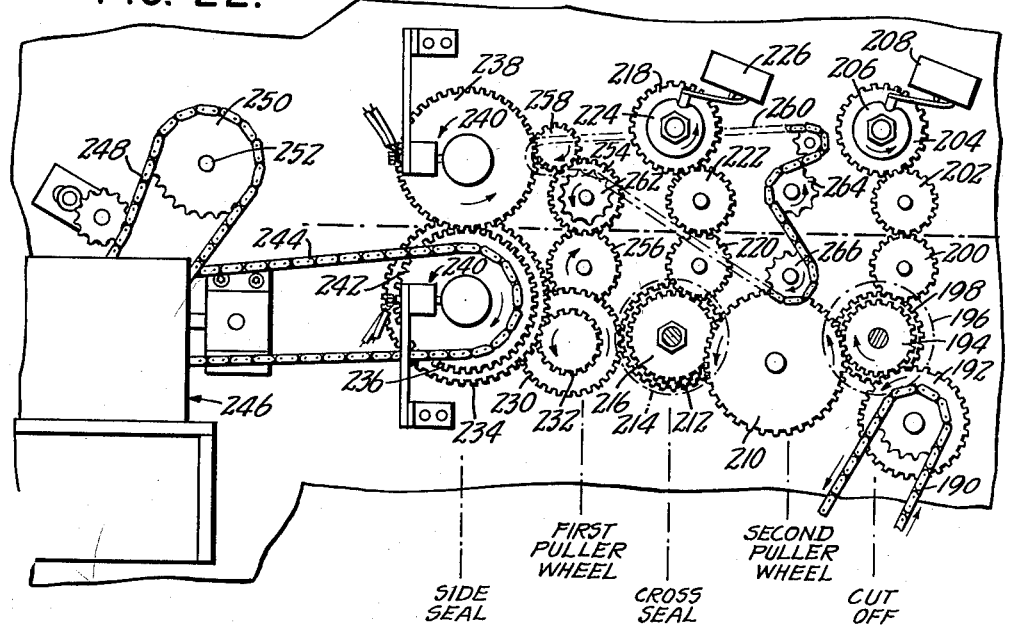
Figure 23:
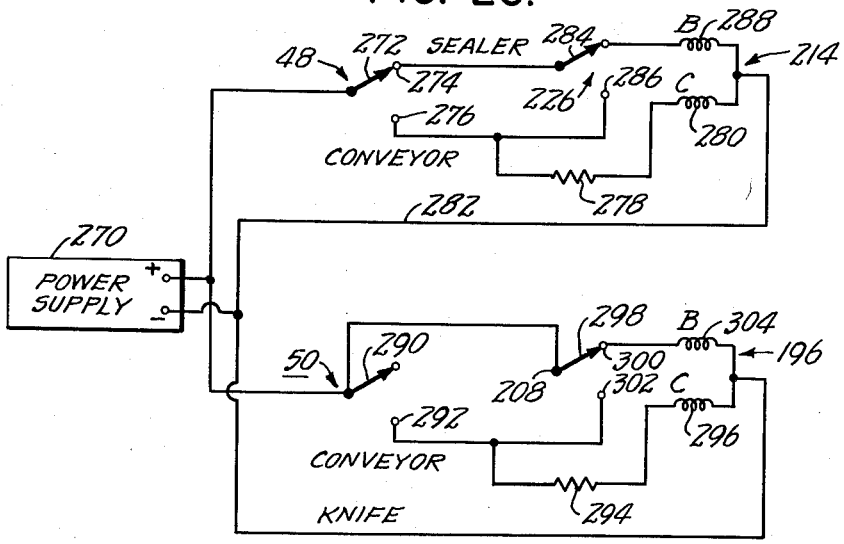

Figures 19, 20, and 21 illustrate the operation of the cutting mechanism;

Figure 22 is a partial elevational view showing the construction of the driving mechanism for the conveyor, sealing, and cutting mechanism; and Figure 23 is a simplified circuit diagram of the circuits for operating the sealing and cutting mechanisms.

In operation, articles to be packaged are placed on a conveyor generally indicated at 2 in Figure 1 which carries them into a packaging and sealing mechanism generally indicated at 4 where each of the articles placed on the conveyor 2 is sealed in a separate plastic container. The conveyor 2 includes an endless chain 6 formed, for example, of a series of metal blocks, as at 8, which serve as chain links and are flexibly connected together by any suitable means such as a wire or hinged chain linkage members. The chain 6 passes over a drive sprocket 10 at one end and at its other end over a similar sprocket (not visible in Figure 1) which is mounted on a shaft 12 supported in two bearing blocks 14. The blocks 14 are readily adjustable by means of screw members 16 and 18 thus permitting convenient adjustment of the tension on the chain 6. The chain 6 is driven continuously by the sprocket 10 in the direction indicated by the arrow 20.

At spaced intervals along the chain 6 special carrier links 22 extend laterally beyond the forward side of the other portions of chain 6. These carrier members 22, when on the lower part of the chain 6, rest on a continuously moving belt 24 formed, for example, of heavy canvass or other suitable material (see also Figure 2).

At the end nearest the packaging mechanism 4, the conveyor belt 24 passes over a roller 26 of small diameter (see also Figure 3), around a tension roller 28 and a drive roller 30, and thence back around a roller (not shown) at the opposite end of the web which is supported by a shaft 32 and two movable bearing blocks 34 arranged to permit convenient adjustment of the tension on the belt 24. The belt 24 is arranged to move at constant speed with its upper surface moving in the direction of the arrow 20 and at the same speed as the chain.

The chain and belt assemblies are carried by a suitable framework including a rear panel 36 and a front frame member 38. One end of the assembly may be supported by legs 40 or other suitable means, while the other end of the assembly is supported by a main housing or cabinet 42. The chain 6 is carried along the upper and lower edges of a supporting track 44 (Figure 2) and is supported by screw members 46 from the rear frame member 36.

A series of switches indicated at 48, 50, 52 and 54 in Figure 1 are mounted on a bar 56 which is supported by the track member 44. These switches are conventional type micro-switches and arranged to be actuated by the carrier members 22 extending from the chain 6 to control the operation of the sealing and cutting mechanisms as will be described in more detail below. Thus in operation, articles are placed upon the upper surface of the belt 24 each between one of the carrier members 22 of the chain 6 and will be carried by the belt 24 into the sealing mechanism 4.

The material in which the articles are to be packaged consists of two plastic webs 58 and 60 (Figure 3) which are supplied respectively from rolls 62 and 64 (please see Figure 1) suitably supported in conventional manner. In this example, the webs are formed of heat sealable plastic material such as polyethylene although other materials can be used including materials treated with heat-sensitive adhesives.

Figure 3:
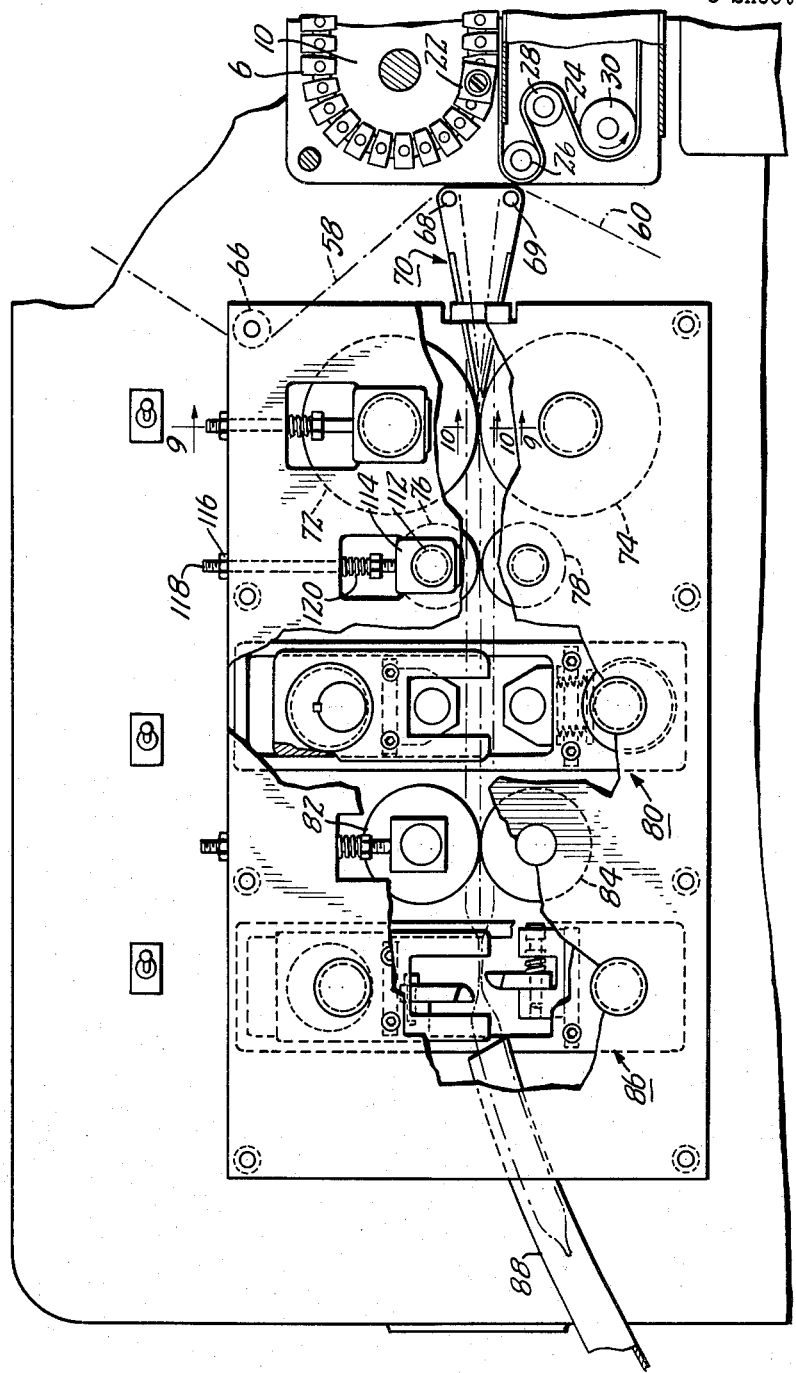
Figure 3 is an elevational view of the sealing and cutting mechanisms with certain of the parts being cut-away to illustrate better the construction.

As best shown in Figure 3, the upper web 58 passes over a guide bar 66, around a roller 68 on the entrance of a former 70 and through the former. The lower web 60 passes around a similar roller 69 and then through the former 70 in a position directly below the upper web 58. The former 70 is arranged, as described later, to cause the two webs to belly outwardly and form a long longitudinal pocket to receive the article to be packaged. The webs then pass between side sealer members 72 and 74 which seal the two webs together along their outer edges. The webs then pass between two sets of rubber covered puller wheels 76 and 78 and then through a cross sealer mechanism 80 which forms spaced cross seals between the two webs of plastic material and which will be described in greater detail later.

The packaging strip then passes between two additional sets of puller wheels indicated at 82 and 84 and then through a cutting mechanism generally indicated at 86.

The articles to be packaged are carried along by the belt 24 and as the belt 24 passes over the roller 26 are transferred to the lower plastic web 60 at the entrance to the former 70. The outer edges of the web are then sealed together and a cross seal is formed by the mechanism 80 between each of the articles being packaged. The cutter mechanism 86 then cuts the strips cross-wise through the center of each heat seal so that individual packaged articles are delivered continuously and at a high speed to a delivery chute 88. It will be noted that the belt 24 has a small radius of curvature, in this example between ½ and 1 inch, as it passes around the roller 26 so that small articles can be transferred from the belt to the packaging mechanism.

The construction of the former 70 will be described in connection with Figures 4, 5, 6 and 7. The two rollers 68 and 69 are rotatably supported by triangular end-plates 90 and 92 which are also tapered in thickness with increasing thickness in the forward direction of the former as best shown in Figure 5. The end plates are joined by upper and lower guide plates 94 and 96 which are provided with shaped cut-outs as indicated at 98 in Figure 5. As indicated in Figure 6 the ends of the guide plates 94 and 96 at the forward end of the former are spaced apart sufficiently to permit the edge portions of the two webs to pass between them. Each of the webs of plastic material is substantially the same width as the former at the entrance to the former, but because of the increasing thickness of the side members 90 and 92 the passageway through the former becomes narrower thus causing the two webs to belly out through the openings 98 so that in cross section the two webs form a tube having a longitudinal pocket as indicated by the broken line 100 in Figure 6.

It will be noted that the forming of the plastic material is accomplished without any form members or other obstructions between the plastic webs so that the entire space between the webs is available for the reception of the articles to be packaged.

Figure 4:
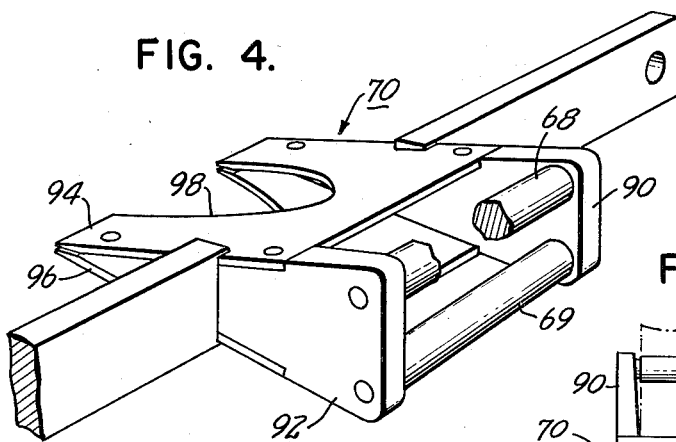
Figure 4 is a perspective view of the web former at the entrance to the sealing mechanism.
Figure 5:
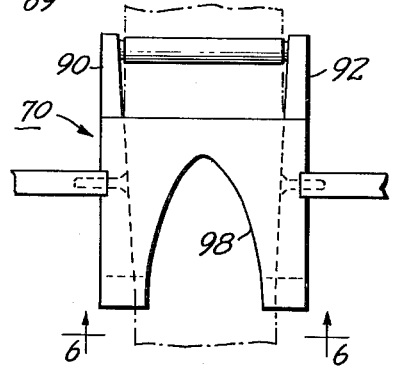
Figure 5 is a plan view of the former shown in Figure 4.
Figure 7:
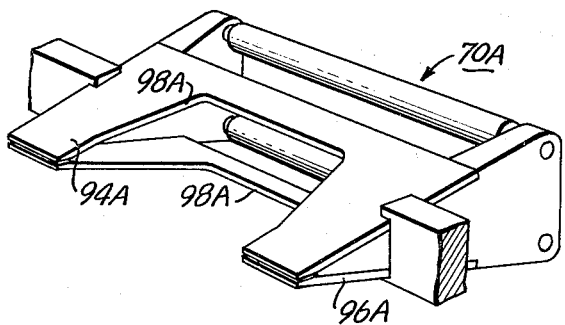
Figure 7 is a perspective view of a modified former.
Figure 6:
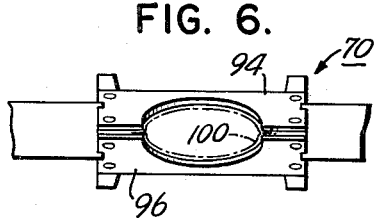
Figure 6 is an elevational view taken along line 6—6 of Figure 5.
Figure 8:
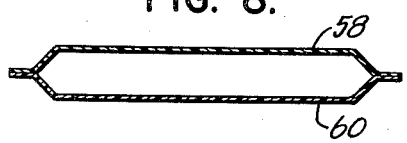
Figure 8 is a sectional view showing the general shape of the packaging web produced by the former shown in Figure 7.

Figure 7 illustrates another former 70A generally similar to the former shown in Figures 4, 5 and 6 but the upper and lower guide plates 94A and 96A are provided with more nearly rectangular cut-out portions 98A. This type of former shapes the webs 58 and 60 to form a channel having the general cross-sectional shape illustrated in Figure 8. Thus, it will be apparent that various shapes of cross sections can be formed by suitably shaping the openings 98 in the guide plates 94 and 96 but either of the illustrated shapes is suitable for the packaging of many different objects of substantially different sizes and shapes without modification of the former.

Figure 9:
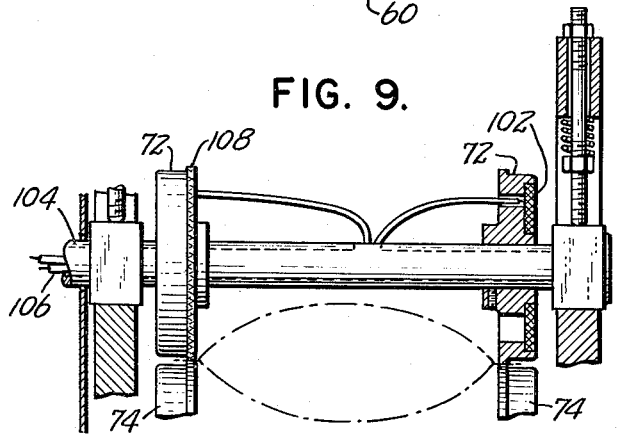
Figure 9 is a partial sectional view of the sealing mechanism taken along line 9—9 of Figure 3 with the shape of the web indicated in broken lines as produced by the former shown in Figure 4.

Immediately after leaving the former the edge portions of the two webs are sealed together between sealers 72 and 74 indicated in Figure 9. The upper sealers 72 are heated by means of conventional heating units 102 which are connected through a center opening in a drive shaft 104 to power leads 106 to which connection is made by conventional slip rings.

Figure 10:
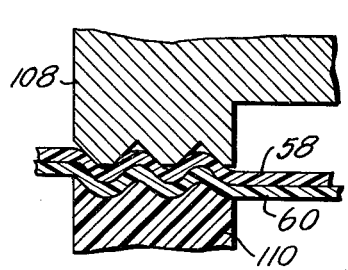
Figure 10 is a partial sectional view taken along line 10—10 of Figure 3 showing the construction of the side sealers.

Each of the sealers 72 carries a metal rim 108 which has a serrated face as best shown in Figure 10. The lower sealers 74 are not heated but are arranged to maintain the webs under pressure against the upper sealers 72. These lower sealers are provided with a resilient surface layer 110, as shown in Figure 10, which presses the plastic web into the serrated surfaces of the sealer 72 forming an effective heat seal. If desired, the surfaces of the lower sealers 74 may also be provided with a serrated material but the resilient surface material has been found to be more convenient for adjustment and offers substantial advantages in the set up and operation of the machine.

The puller wheels 76 and 78 (Figure 3) operate in conventional manner and the upper pair of wheels 76 are driven, as described later, to pull the web through the machine. However, the peripheral speed of the puller wheels 76 and 78 must be such as to maintain the proper tension on the plastic web. In order to provide a vernier adjustment of the peripheral speed of these rollers they are provided with a resilient rim, for example in the form of a rubber tire, and are supported by a shaft 112 mounted on a pair of movable bearing blocks 114 which can be adjusted vertically by means of a nut 116 which moves a shaft 118 against the force of a coil spring 120. Each end of the shaft 112 is carried by a similar movable bearing block. As the upper and lower puller wheels 76 and 78 are pressed together with greater force by adjustment of the nut 116, the effective diameter of the wheels is reduced thereby lowering the peripheral speed of the rollers in the contact area and reducing the tension on the plastic web. As the pressure between the puller wheels 76 and 78 is reduced the pulley speed increases thus increasing the tension on the web. The puller wheels are arranged to engage the plastic web with sufficient opening in the region between the wheels on each side of the web to permit the pocket for the article to pass between them without deformation.

After leaving the puller wheels 76 and 78 the web passes through the sealing mechanism 80 whose construction will be described in connection with Figures 11 through 16.

The sealing is accomplished by means of an upper cross sealing member 121 and a lower cross sealing member 122. These members are substantially conventional in construction and are provided with openings 124 and 126 in which are positioned conventional thermostatically-controlled heating elements and are provided with serrated faces as indicated at 128. When the two sealing members 121 and 122 are engaged with the web between them the two layers of the web are sealed together across the entire width. Such sealing members, for example, can be supported on a pair of wheels or rollers and arranged so that as they are rotated the two sealing members will engage once during each revolution of the drive rollers. However, with such an arrangement, the two heat sealing members approach each other along the arc of their respective paths and in doing so will interfere with the web if articles of substantial thickness have been inserted therein. Accordingly such an arrangement limits the packaging to articles of relatively limited thickness.

Figure 11:
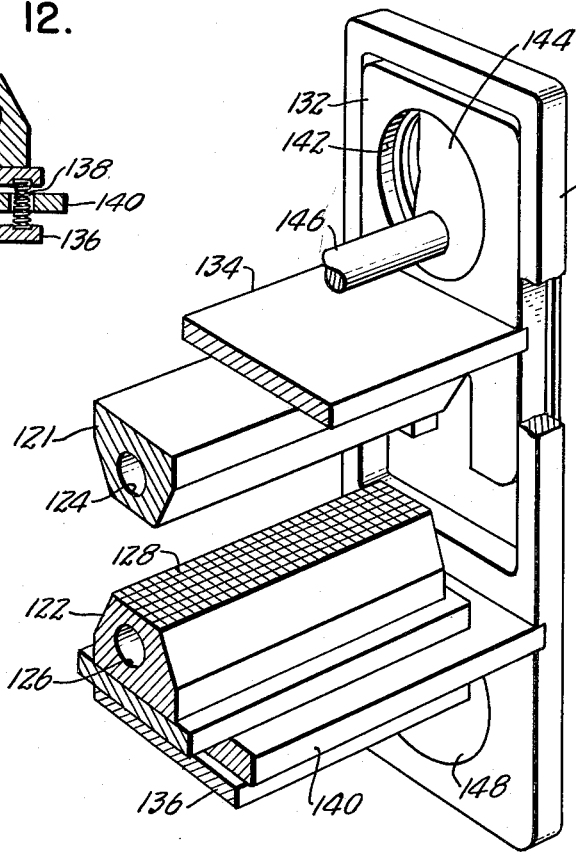
Figure 11 is a partial perspective view illustrating the operation of the cross sealing members.

In the arrangement shown in Figure 11, the two sealing members 121 and 122 move more or less directly away from and toward each other thus permitting articles of substantial thickness to be packaged. In order to accomplish this, the two sealing elements are mounted in a pair of supporting frames, one of which is shown at 130 in Figure 11. Moreover, within the support frame 130 is a slide member 132 which carries a horizontally extending plate 134 which is supported in a similar manner on the opposite side of the heat sealing mechanism. The slide 132 is arranged so that it can move vertically within the support frame 130 and the support frame 130 is free for both vertical and lateral movement in the same plane. The sealing member 121 is secured to and carried by the supporting plate 134.

Figure 12:
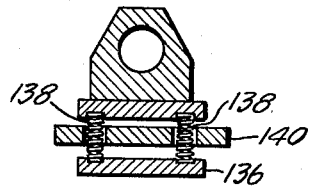
Figure 12 illustrates the resilient mounting of the lower cross sealing member.

The lower sealing member 122 is spring mounted to an auxiliary support member 136 by means of coil springs 138 (Figure 12). The auxiliary plate 136 is in turn secured to a support plate 140 which extends between the two support frames 130. Thus, the sealing member 122 is carried by the supporting frame 130 but is permitted a certain amount of vertical movement with respect to it by virtue of the mounting springs 138. The slide member 132 has circular opening 142 in which is rotatably mounted a drive disk 144. An eccentrically-positioned drive shaft 146 is secured to the drive disk 144 and in operation rotates on its own axis which is maintained in a fixed position.

Figure 13:
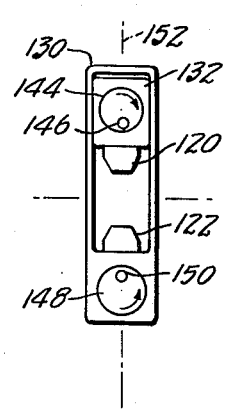
Figures 13 through 16 are diagrammatic sketches illustrating the operation of the cross sealing mechanism.

Near the lower end of the support frame 130 a similar circular opening carries within it a rotatable drive disk 148 to which is eccentrically secured a drive shaft 150 (see Figure 13). In operation the shaft 150 which is secured to the disk 148 is rotated about its own longitudinal axis which also remains in a fixed position.

Figure 14:
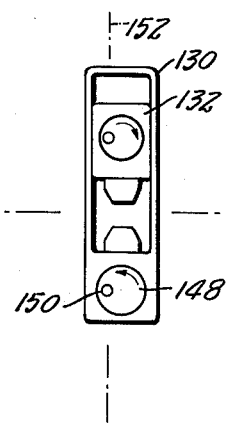
Figure 15:
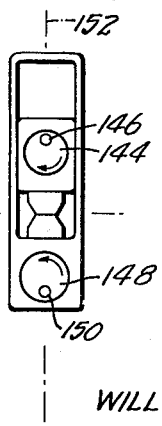

The operation will be best understood by examination of the diagrammatic sketches of Figures 13, 14 and 15. Assume the sealing members 121 and 122 to be in the position of widest space as shown in Figure 13 and that the plastic web is moving from right to left as seen in these views. The shaft 146 is rotating in a clockwise direction about its own axis carrying with it the eccentrically-mounted disk 144; the lower shaft 150 is rotating about its longtudinal axis carrying with it the eccentrically-mounted disk 148 and rotates in a counter clockwise direction. Rotation of the shaft 146 causes the slide member 132 to move downwardly within the support frame 130 to the position shown in Figure 14. Whereas similar rotation of the drive disk 148 about shaft 150 has caused a relative upward movement of the frame 130 and the entire assembly including the support frame 130 has been displaced to the right as can be seen from the reference line 152. Continuing rotation of the two drive members to the position shown in Figure 15 has brought the two sealing members into engagement and has moved the entire assembly to the left in synchronism with the web movement. The next 90 degrees of rotation will move the sealing members further toward the left and vertically away from each other.

Figure 16:
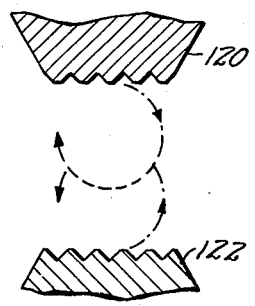
Figure 17:
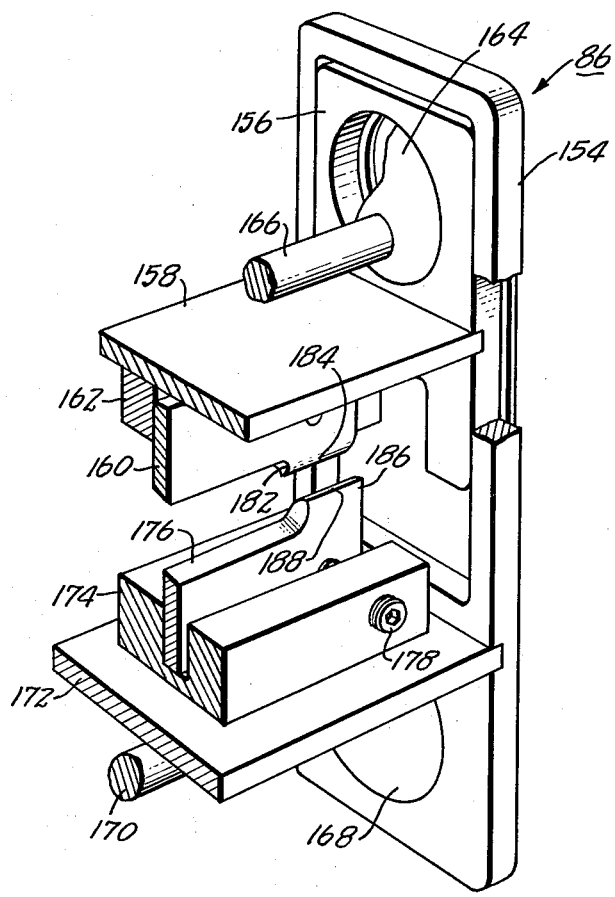
Figure 17 is a partial perspective view showing the construction of the cutting mechanism.

Because the lower sealing member 122 is resiliently mounted, the two sealing members remain in engagement for a substantial period of time during which time the sealing operation is taking place and the sealing members are moving with the web. The relative paths of the sealing members are indicated in Figure 16. The upper sealing member which is not resiliently mounted follows a substantially circular path, but the lower member because it is spring mounted follows the path of the upper sealing member during the time the two members are in engagement.

After the heat sealing operation is completed the web passes through a second set of puller wheels 82 and 84, whose construction is substantially similar with the wheels 76 and 78 already described, and into the cutting mechanism 86.

The cutting mechanism is shown most clearly in Figures 17 through 21. The operation of the drive mechanis is substantially the same as that described in connection with the sealing mechanism and has the same advantages and also the additional advantage that the cutting edges may be readily replaced without special fitting or grinding operations. Because the drive mechanism at each end of the shear may be identical, only one of these mechanisms will be described in detail. The entire assembly is mounted in a support frame 154, similar in construction to the support frame 130 of Figure 11. This support frame carries a movable slide 156 on which is mounted a support member 158 that extends across to the other side of the shear and which carries a knife 160 secured by means of a mounting block 162 to the support 158. A circular drive disk 164 is rotatably positioned within a circular opening in the slide member 156 and is secured to a drive shaft 166 eccentrically positioned on the disk 164 and arranged in operation to rotate about its own longitudinal axis which remains in a fixed position. Near its lower end, the support frame 154 carries a similar drive disk 168 which is secured to an eccentrically-mounted shaft 170 and which is arranged to rotate within an annular opening in the support frame 154. Another support member 172 is secured to the support frame 154 and supports the lower knife structure. This support 172 carries a channel member 174 in which is mounted a second knife 176 similar in construction to the knife 160 but which is resiliently mounted by means of screws 178 which extend across the opening in the channel 174 and through the knife 176. The compression spring 180 is positioned around the screw 178 and between one surface of the channel and the adjacent surface of the knife 176. Accordingly, the knife 176 is pressed against one face of the channel 174 by the spring 180, but can be moved laterally within the channel against the force of the spring 180. The knife 160 at its end nearest the support frame 154 has a downwardly extending portion 182 which has a curved surface as indicated at 184 in Figure 19. The lower knife 176 carries a corresponding upwardly extending portion 186 having a curved surface as indicated at 188 in Figure 19. As the two knives approach, as shown in Figures 20 and 21, the curved surfaces 184 and 188 engage and move the knife 176 laterally within the channel member 174. As the knives come together the cutting edges adjoining the portions 182 and 186 shear the web and because the knives are tapered the shearing action proceeds across the web as the two knives are brought together. Thus a fixed and effective shearing action is achieved which does not in any way interfere with the packaging of relatively bulky articles and which provides lengthwise cutting surfaces which can be interchanged readily with other stock parts.

Figure 22 shows a portion of the interior of the packaging machine showing the operating mechanism. A drive chain 190 is connected to an electric motor (not shown) and rotates a gear 192 in the direction indicated by the arrow. The gear 192 engages a smaller gear 194 which is connected to one section of a magnetic clutch and brake assembly indicated diagrammatically at 196. The other section of the clutch assembly drives a gear 198 which engages another gear 200 that drives gears 202 and 204. The gears 198 and 204 are arranged to drive the cutting mechanism 86 already described. A cam 206 rotates with the gear 204 and operates a one-turn limit switch 208 whose function will be described below.

The continuously rotating gear 194 also engages a gear 210 which is arranged to drive a gear 212 which is connected to one section of a second magnetic clutch and brake assembly indicated diagrammatically at 214. The other section of the clutch assembly is connected to a gear 216 which drives a gear 218 through a gear train consisting of gears 220 and 222. The gears 216 and 218 drive the cross seal mechanism 80 described above. A cam 224 rotates with the gear 218 and operates another one-turn limit switch 226 whose function will be described below.

The gear 212 engages a gear 230 which through a smaller gear 232 drives a gear 234 which is connected by a common shaft to a drive gear 236. The gear 236 drives a gear 238 of the same size, the gears 236 and 238 being pinned respectively to shafts which drive the side sealers 72 and 74 as described above. The heating elements of the side sealers are supplied with power through slip-ring assemblies generally indicated at 240, the lower slip-ring assembly being used only when the lower sealer wheels are heated.

A gear 242 is driven by the gear 234 and through a drive chain 244 operates a variable speed mechanism of conventional design indicated at 246. The output from the variable speed mechanism indicated at 246 is connected by means of a chain 248 to a gear 250 to cause rotation of a shaft 252, which rotates the drive gear 10 shown in Figure 1 that moves the conveyor chain 6. This same drive mechanism drives the belt 24 at the same speed as the conveyor chain through a conventional drive mechanism not shown. The variable speed drive mechanism permits immediate variation in the speed of the conveyor chain to permit synchronization of the cutting and sealing operation with printed matter on the web.

The puller wheels 76 and 78 are driven by means of gears 254 and 256 from the gear 238 through an intermediate drive gear 258. The other puller rollers 82 and 84 are driven by means of a chain 260 which passes over a sprocket 262 pinned to the same shaft as the gear 254. This chain 260 passes over sprockets 264 and 266 which are arranged to drive the puller wheels 82 and 84.

The electrical circuit for operation of cutting and sealing mechanism is shown in Figure 23. A power supply 270 provides direct current power for operation of the clutch and brake assemblies 196 and 214. When one of the projecting chain lengths 22 (see also Figure 1) strikes the microswitch 48, its switch arm 272 is moved from contact 274 to contact 276. This connects the circuit extending from the positive terminal of the power supply through the switch arm 272 and contact 276, a fixed resistor 278, and the energizing winding 280 of the clutch portion of the clutch and brake assembly 214 and a lead 282 to the negative terminal of the power supply. The circuit energizing the brake winding 288 is interrupted at the same time.

This causes the sealing mechanism to start its cycle of operation. As soon as the mechanism starts to move, the cam 224 shown in Figure 22 operates the switch 226 and moves the arm 284 to the terminal 286. When the switch 48 returns to its normal position in which it engages contact 274 after the extending chain links 22 passes beyond it, the circuit to the clutch winding 280 is not interrupted because the circuit is now completed through the switch 226. When the cam 224 has completed one revolution the switch 226 is then returned to the position shown in Figure 23 in which the clutch solenoid 280 is deenergized and the brake solenoid 288 is engaged to immediately stop further movement of the mechanism. Thus, every time the switch 48 is actuated by one of the chain links 22 the sealer goes through one cycle of operation. In a similar manner the switch 50 controls the operation of the cutting mechanism. When one of the extending chain links 22 actuates the switch 50, its movable arm 290 engages the contact 292 to complete a circuit from the positive terminal of the power supply through a fixed resistor 294 and the clutch solenoid 296 of the clutch and brake assembly 196, thus setting the cutting mechanism in motion. As soon as the cutting mechanism starts, the cam 206 actuates the switch 208 causing the movable arm 298 to move from contact 300 to contact 302 so that when the switch 50 returns to the position shown in Figure 23 the clutch assembly 196 is energized through the switch 208. When the cutting knife has gone through one cycle of the operation, the cam 206 has made one revolution and the switch 208 returns to the position shown in Figure 23 with the clutch solenoid 296 deenergized and the brake solenoid 304 energized.

Thus each time one of the extending chain links 22 actuates the switch 50 the cutting mechanism is caused to go through one cycle of operation and then stop abruptly.

As can be seen from examination of Figure 1, the length of the bag which is to be made is determined by the spaces between the extending chain links 22 and, that in order to vary the bag lengths it is only necessary to change the space between the extending chain lengths, the synchronizing being taken care of automatically. The positions of the switches 48 and 50 can be adjusted readily along the supporting bar 56.

The switches 52 and 54 (Figure 1) control the operation of the speed changer 246 (shown in Figure 22) to synchronize the movement of the conveyor, and therefore the sealing and cutting operations with any printed matter on the webs of plastic material. In practice, a mark placed on the web adjacent each printed panel actuates a photocell. If the two switches 52 and 54 are both closed when the photocell is actuated the speed remains unchanged. If, however, only one of the switches 52 or 54 is closed when the photocell is actuated, the speed of the belt is increased or decreased slightly as necessary to bring the operation back into synchronism.

The diameter of the roller 26 shown in Figure 3 is particularly important where small articles are to be packaged. In any event, the belt 24 should pass at least ninety degrees around a small radius of curvature in the area immediately adjacent the web 60. This radius of curvature should not be greater than five-eighths of an inch. When narrower widths of web are used an even smaller radius of curvature is desirable. For best operation, the radius of curvature should be less than one-fourth the width of the web.

I claim:

1. Apparatus for performing a predetermined operation on a moving web of material in which the faces of two elements are brought into contact with said web from opposite sides thereof and perform said operation while moving in the general direction of movement of said web comprising a pair of eccentrics mounted on opposite sides of said web, movable frame means driven by said eccentrics and moving back and forth in the direction of movement of said web, slide means carried by said frame means and movable back and forth in the direction perpendicular to said web, said frame and slide means movably supporting said elements for simultaneous movement around closed paths while maintaining said faces in a common plane, and drive means arranged to turn said pair of eccentrics to move said elements toward each other to make contact with said web and to move said elements together in the general direction of movement of said web while said elements are in contact with said web and to move said elements away from said web back to their initial positions.

2. Apparatus as claimed in claim 1 including resilient mounting means positioned between said frame means and one of said elements.

3. Apparatus as claimed in claim 1 wherein the operation is a cutting operation and each of said elements is a knife.

4. Apparatus as claimed in claim 1 wherein the operation is a heat sealing operation and each of said elements is a heat-sealing member including means for heating at least one of said elements.

5. Heat sealing apparatus for sealing a moving web of heat-sealable material comprising first and second heat-sealing elements positioned on opposite sides of said web and having opposed faces arranged to engage said web therebetween, means movably supporting said first and second elements for simultaneous movement around closed paths while maintaining said faces in a common plane, a pair of rotatable disks on opposite sides of said moving web, and a pair of drive shafts each connected to one of said disks in an eccentric position, thereby rotating said disks eccentrically, said disks being arranged to move said elements toward each other to engage said web and to move said elements together in the general direction of movement of said web while said web is engaged therebetween and to move said elements away from said web back to their initial positions.

6. Apparatus as claimed in claim 5 including resilient mounting means between said element and said supporting means.

7. Apparatus for forming lateral heat seals between moving webs of heat-sealable plastic material comprising first and second sealing elements having opposed face portions adapted to engage the outer surfaces of said webs, a frame member supporting said second sealing element, a slide member supporting said first sealing element and slidably supported by said frame member for linear sliding movement toward and away from said second sealing element, a first drive disk slidably positioned in an annular opening in said slide member, a first drive shaft connected to said first disk and eccentrically positioned with respect to the center of said disk, a second drive disk slidably positioned in an annular opening in said frame member, a second drive shaft connected to said second disk and eccentrically positioned with respect to the center of said disk, and drive means arranged to rotate said first and second drive shafts in opposite directions.

8. Apparatus as claimed in claim 7 including resilient means secured to one of said elements and mounted on one of said members, whereby said one element is resiliently supported and adapted to follow the course of the other element over a portion of its movement.

9. Apparatus as claimed in claim 8 in which said resilient means is secured to said second sealing element and said resilient means is mounted on said frame member, whereby said second sealing element is enabled to move with respect to said frame member, thereby to follow the course of the first sealing element when both sealing elements are in engagement with opposed face portions of the heat-sealable material.

10. Apparatus for cutting transversely a moving web of material comprising first and second cutting knives positioned in opposed relationship on opposite sides of said web, a frame member supporting said second knife, a slide member supporting said first knife and slidably supported by said frame member for linear sliding movement toward and away from said second knife, a first drive disk slidably positioned in an annular opening in said slide member, a first drive shaft connected to said first disk and eccentrically positioned with respect to the center thereof, a second drive disk slidably positioned in an annular opening in said frame member, a second drive shaft connected to said second disk and eccentrically positioned with respect to the center of said disk, and drive means arranged to rotate said first and second drive shafts in opposite directions.

11. Apparatus as claimed in claim 10 including resilient means interconnected between one of said knives and one of said members and urging said one knife toward the other.

12. Apparatus as claimed in claim 11 wherein at least one of said knives includes a guide surface adapted to engage the other knife before the cutting action commences for guiding the knives into cutting relationship against the action of said resilient means.

13. In a strip packaging machine wherein two webs of material are brought together and sealed to form a series of separate pockets to contain items being packaged, apparatus for forming the two webs to define a longitudinal chamber for reception of the items to be packaged comprising first and second converging guide plates having the center portions of their adjacent edges cut out, said converging guide plates engaging the outside surfaces of said webs and arranged to direct said webs into face-to-face relationship and the adjacent edges of said guide plates bringing outer edges of said webs into engagement, and first and second converging edge-guiding means positioned along opposite edges of said webs, said edge guiding means having opposed surfaces adjacent the edges of said webs and approaching each other in the direction of web movement, the minimum distance between said edge-guiding means in a direction perpendicular to the direction of web movement being less than the width of said webs.

14. In a strip packaging machine, a former for directing two webs of material into position to form a longitudinal pocket therebetween for the reception of articles to be packaged comprising first and second former plates positioned at an acute angle to each other and with their leading edges being nearest together and spaced near the outer portions sufficiently to permit the edge portions of said webs to slide therebetween, each of said former plates having a recessed portion extending inwardly from the leading edge thereof, first and second edge-guiding members positioned between said former plates and having inner juxtaposed surfaces forming an angle with the direction of travel of said webs therebetween and being spaced apart in the area nearest the leading edges of said former plates a distance less than the width of said webs, and web driving means for pulling said webs through said former between said former plates whereby said webs are gradually restricted at their edges by said edge-guiding members and caused to belly outwardly in opposite directions into said recessed portions thereby to form a longitudinal pocket therebetween to receive articles to be packaged and free of obstruction within said pocket by any part of said former.

15. In a packaging machine wherein two webs of packaging material are brought together and secured together to enclose articles placed between the webs, forming apparatus for forming the two webs together into a longitudinal chamber for reception of the articles to be packaged comprising first and second guide means having inner surfaces converging toward each other, said guide means having a first and second pair of closely adjacent converging end portions adapted to bring the edges of the webs together in face-to-face relationship, said pairs of end portions being spaced apart sufficiently to permit the thicknesses of the adjacent edges of the webs to pass therebetween, said first pair of end portions straddling one pair of the adjacent edges of both webs and said second pair of end portions straddling the other pair of adjacent edges of both webs, the central region of said guide means between said first and second pair of closely adjacent end portions defining an enlarged opening to permit the central portions of the two webs to belly out into a chamber for reception of the articles, and a pair of converging edge guiding members engaging the respective pairs of adjacent edges of the webs and moving these pairs of edges toward each other, thereby to cause the central portions of the two webs to belly out into the enlarged opening defined by said guide means.

16. In a packaging machine wherein two webs of packaging material are brought together to enclose articles inserted between the webs, forming apparatus for bringing the respective edges of the two webs together in face-to-face relationship and for bellying out away from each other the central portions of the webs, thereby to form a longitudinal tube for reception of the articles into said tube, said forming apparatus including a pair of generally triangular edge guiding members having inner surfaces converging toward each other in the direction of web movement, an upper guide plate and a lower guide plate, said guide plates being secured to the upper and lower edges of said triangular edge guiding members and converging toward each other in the direction of web movement, said guide plates including a first and a second pair of closely adjacent end portions for bringing the respective edges of said webs together into fact-to-face relationship, said guide plates defining an enlarged opening between said end portions, the inner surfaces of said edge guiding members engaging the respective adjacent edges of said webs for causing them to move laterally toward the opposite edges, whereby to belly out away from each other the central portions of the webs to form a longitudinal tube passing through said enlarged opening.

17. Cutting apparatus for shearing along a transverse line a web of packaging material, said apparatus comprising a first and a second shearing means mounted on opposite sides of said web, said first shearing means including a first movable mounting member and a shearing element secured in fixed position on said mounting member, said shearing element extending transversely across the web, said second shearing means including a second movable mounting member and a second shearing element mounted on said second mounting member and extending transversely across the web on the opposite side from said first shearing element, said second shearing element being laterally movable within limits with respect to said second mounting member and a spring urging said second shearing element toward one limit of its lateral movement, driving mechanism connected to both of said mounting members and adapted to bring said shearing elements against opposite sides of the web with the web therebetween and then to slide said shearing elements into overlapping relationship to produce a shearing action, an extending portion on one of said shearing elements having a surface adapted to engage the other shearing element before said shearing elements are in overlapping relationship, said surface being inclined and as said shearing elements approach each other causing said second shearing element to move laterally away from said one limit against the action of the spring, whereby to bring said shearing elements into aligned position for moving into overlapping relationship to produce a shearing action.

18. In a packaging machine wherein a moving web of material is formed into a series of packages for various articles, vernier adjustment mechanism for adusting the tension along one edge of the moving web comprising a pair of opposed puller wheels on opposite sides of the web and engaging the edge of the moving web, a rim portion of resilient material on at least one of said wheels, a pair of shafts connected to said wheels for driving said wheels, a movable bearing block carrying one of said shafts, and manual adjustment means for moving said bearing block toward and away from the other shaft, thus changing the pressure exerted by said wheels against opposite sides of said edge, increasing pressure compressing said resilient rim portion, thereby reducing the effective radius of said one wheel and consequently reducing the effective rim speed for changing the tension in said edge of the web of material.

References Cited in the file of this patent

UNITED STATES PATENTS

| | | |
|---|---|---|
| 2,134,862 | Dunnam | Nov. 1, 1938 |
| 2,142,505 | Gammeter | Jan. 3, 1939 |
| 2,162,106 | Ness | June 13, 1939 |
| 2,340,260 | Cluman | Jan. 25, 1944 |
| 2,374,504 | Salfisberg | Apr. 24, 1945 |
| 2,578,799 | Grey | Dec. 18, 1951 |
| 2,600,216 | Denison | June 10, 1952 |
| 2,603,928 | Clark | July 22, 1952 |
| 2,611,225 | Williams | Sept. 23, 1952 |
| 2,613,488 | Attride | Oct. 14, 1952 |
| 2,651,896 | Woodruff | Sept. 15, 1953 |
| 2,762,178 | Campbell | Sept. 11, 1956 |